UNITED STATES PATENT OFFICE.

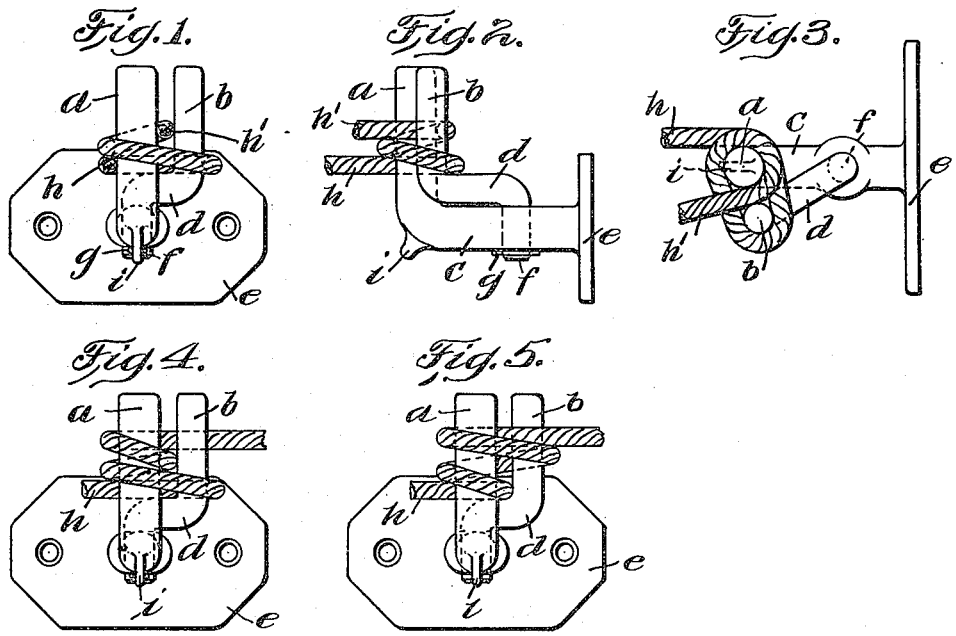

JOSEPH J. MORAN, OF CHELSEA, MASSACHUSETTS.

HOOK.

1,163,944. Specification of Letters Patent. Patented Dec. 14, 1915.

Application filed April 21, 1910. Serial No. 556,788.

*To all whom it may concern:*

Be it known that I, JOSEPH J. MORAN, of Chelsea, in the county of Suffolk and State of Massachusetts, have invented certain new and useful Improvements in Hooks, of which the following is a specification.

This invention relates to a hook or lineholder intended to enable a line to be secured without being knotted.

It is always difficult and sometimes impossible to secure a line, after pulling it taut, by tying a knot, without permitting the line to slacken somewhat.

It is my object to provide a gripper which will enable the line to be secured as soon as it is tightened, and without requiring a knot to be tied.

A further object is to provide a lineholder adapted to secure a line at an intermediate point, between other supported or secured points of the line, in such a way that if the length of line on either side of the support should break, the length on the other side of the support will still be held, whereby, in case of breaking of the line supported or secured at a number of points, only the broken stretch between two points will fail, without slackening the entire length of the line.

In the drawings forming a part of this specification, I have illustrated various forms of hook in which my invention may be embodied and various modes of its use, although without attempting to show all the modifications or all the modes of use which may be employed without departing from the scope and spirit of the invention as claimed.

In the drawings, Figure 1 represents a front view of a device in which my invention is embodied. Fig. 2 is a side view of the same. Fig. 3 is a plan view. Figs. 4 and 5 are front views illustrating different modes of use of the device.

The same reference characters indicate the same parts in all the figures.

In its simplest form the hook or linegripper consists of two relatively movable gripping members $a$ and $b$, preferably formed as pins or members parallel with each other and movable together and apart. These members may be supported in any suitable manner, provided that they are relatively movable and remain always in parallelism, and one mode of supporting them is to provide them with shank portions $c$ and $d$ which are pivotally connected. Conveniently the shank $c$ is formed upon a plate $e$ which is rigidly attached to any support, such as a post, wall or the like, while the shank $d$ is formed with a pivot $f$ which passes through an opening in the shank $c$ and is retained therein by a key or pin $g$. The shanks $c$ and $d$ extend side by side a certain distance from the pivotal connection and their ends are then bent up at right angles to form the hook like grippers $a$ and $b$ which are not only parallel to each other, but are also parallel to the axis of the pivotal connection. It will be readily seen that the members $a$ and $b$ are thus adapted to swing together and apart.

One manner of using the device is to pass the line which is represented at $h$ around both grippers $a$ and $b$ and then between them. That is, the line, as appears best from figures 1 and 2 is bent around the gripper $a$ and carried in back of both grippers. It is then bent around the gripper $b$ and carried in front of the grippers, being finally bent a second time around the gripper $a$ and passed between the grippers. When the line is so connected a pull on the standing part of the line causes the grippers to be forced together and to press upon the interposed end $h'$ of the latter. The end portion $h'$ may be pulled easily through the space between the grippers in order to tighten the line, but as soon as released the pull on the standing part immediately forces the grippers together and prevents any slackening of the line. At the bottom of the gripper $a$ and approximately at the bend where the latter joins the shank $c$, is a stop $i$ which is provided to prevent the line from slipping down over the bend and becoming loosened.

Another mode of using the invention is illustrated in Fig. 4. This is the same as previously described, except that after being passed through the grippers, the line is bent entirely around the gripper $a$ and carried in back of both grippers, being then brought forwardly from the gripper $b$. The part of the line interposed between the grippers is thus intermediate two turns of the line which are passed in opposite directions around both grippers, whereby a pull on either end of the line will cause the grippers to be pressed together upon the interposed part of the line.

In the mode of fastening illustrated in Fig. 5, the line is first carried completely around the gripper a, then around both grippers, and then passed out between the grippers. With this mode of attachment there is a single turn of the line about both grippers and two points on the line interposed between the grippers, these interposed points being on each side of the turn which surrounds both grippers. In this form of attachment also a pull on either end of the line causes the grippers to be brought together on both interposed parts of the line. Both methods of fastening last described are useful, particularly where a line is supported or gripped at a point between the ends, which are also fastened, as in the case of a clothes line or a line used in securing a load or pack, because owing to the fact that a pull on either end of the line will tighten the hold of the gripper, if any part of the line fails, only that portion will give way, and the remaining stretches or lengths of the line will remain unslackened.

I claim,—

1. A line holder comprising a shank having a pivot opening therein and an upright extension forming a gripping member, and a second shank having an integral end pivot parallel to said gripping member engaging the opening and provided with an upright extension forming a second gripping member that is parallel to the first mentioned gripping member.

2. A line holder comprising a shank having an upright bent portion forming a gripping member, means for supporting said shank, a second shank having a downturned portion pivotally engaging the first mentioned shank and also having an upturned portion forming a gripping member arranged parallel with said bent portion, said bent portion serving as an abutment to limit pivotal movement of the second shank, means for supporting the first mentioned shank, and a guard stop carried by the first mentioned shank.

In testimony whereof I have affixed my signature, in presence of two witnesses.

JOSEPH J. MORAN.

Witnesses:
GEORGE F. FORD,
P. W. PEZZETTI.

Copies of this patent may be obtained for five cents each, by addressing the "Commissioner of Patents, Washington, D. C."